United States Patent [19]

Hilfman

[11] 3,917,562

[45] Nov. 4, 1975

[54] COMBINATION PROCESS FOR THE CONVERSION OF HEAVY DISTILLATES TO LPG

[75] Inventor: Lee Hilfman, Mt. Prospect, Ill.

[73] Assignee: Universal Oil Products Company, Des Plaines, Ill.

[22] Filed: July 16, 1974

[21] Appl. No.: 489,014

[52] U.S. Cl. ............. 208/59; 208/DIG. 2; 208/111; 252/439; 252/442; 252/455 Z
[51] Int. Cl.² .................... B01J 29/22; C10G 13/08; C10G 37/02
[58] Field of Search ........................................ 208/59

[56] References Cited
UNITED STATES PATENTS

| | | | |
|---|---|---|---|
| 3,516,925 | 6/1970 | Lawrance et al. .................. | 208/111 |
| 3,697,415 | 10/1972 | Hamblin .............................. | 208/59 |
| 3,709,814 | 1/1973 | Jaffe .................................... | 208/59 |
| 3,718,575 | 2/1973 | Watkins ............................... | 208/59 |
| 3,775,298 | 11/1973 | Morris et al. ........................ | 208/59 |
| 3,808,122 | 4/1974 | White et al. ........................ | 208/59 |
| 3,833,499 | 9/1974 | Egan et al. ........................... | 208/59 |
| 3,847,796 | 11/1974 | Hilfman et al. ..................... | 208/111 |

Primary Examiner—Delbert E. Gantz
Assistant Examiner—G. E. Schmitkons
Attorney, Agent, or Firm—James R. Hoatson, Jr.; Thomas K. McBride; William H. Page, II

[57] ABSTRACT

Maximum conversion of heavy distillates to LPG is achieved through a combination process involving two stage hydrocracking.

8 Claims, No Drawings

COMBINATION PROCESS FOR THE CONVERSION OF HEAVY DISTILLATES TO LPG

The invention encompassed by the present application relates to a two stage hydrogen-consuming process for selectively producing LPG from a hydrocarbon charge stock boiling above 600°F. Hydrocracking processes are commonly employed for the conversion of heavier hydrocarbons into lower boiling saturated products. Economically successful LPG hydrocracking processes must be selective in order to avoid the decomposition of normally liquid hydrocarbons into undesirable gaseous hydrocarbons such as methane and ethane while maintaining a high activity for extended periods of time. The present invention utilizes a catalytic composite comprising a porous carrier material, a Group VI-B metal component and a Group VIII metal component in the first stage hydrocracking zone and utilizes a catalytic composite comprising a Group VIII metal component combined with a support containing alumina and finely divided mordenite particles in the second stage hydrocracking zone.

Solid catalysts having a propensity to accelerate so-called acid-catalyzed reactions are widely used today in hydrocracking processes. In many applications these catalysts are used by themselves to accelerate the reactions which mechanically are thought to proceed by carbonium ion intermediates. In other applications these acidic catalysts are combined with a hydrogenation-dehydrogenation metallic component to form a dual-function catalyst having both a cracking function and a hydrogenation-dehydrogenation function. In this latter case, the cracking function is generally thought to be associated with an acid-acting material of the porous, adsorptive, refractory oxide-type which is typically utilized as the support or carrier for a heavy metal component such as the metals or compounds of metals of Group VI or Group VIII of the Periodic Table to which the hydrogenation-dehydrogenation function is generally attributed.

In order to effect an acceptable, economically feasible hydrcracking process, the prior art proposes to combine crystalline aluminosilicates with an alumina materail to produce a catalyst having an acidic function which is substantially greater than the sum of the acidity contributed by the alumina alone and the crystalline aluminosilicate alone.

The primary objective of the present invention is to provide an improvement in the process for selectively producing LPG from a hydrocarbon charge stock boiling above 600°F. As hereinafter indicated by specific example, the improvement resides in the chemical character of the catalytic composites which may be used in the second stage catalytic reaction zone. The use of the improvement of the present invention results in a process which exhibits an increased activity without sacrificing the selectivity of the catalyst to produce LPG. A related object is, therefore, to provide a process which functions economically for an extended period of time as a result of the increased efficiency arising through the use of the improved catalytic composite.

Therefore, in a broad embodiment, the present invention relates to an improvement in a hydrogen-consuming process for selectively producing LPG from a hydrocarbon charge stock boiling above about 600°F., contacting said charge stock and hydrogen with a catalytic composite comprising a porous carrier material, a Group VI-B metal component and a Group VIII metal component in a first catalytic reaction zone at hydrocracking conditions and then reacting at least a portion of the first catalytic reaction zone effluent with a catalyst comprising a Group VIII metal component and combined with an alumina carrier material containing a uniform distirbution of finely divided mordenite particles in a second catalytic reaction zone, at hydrocracking conditions including a pressure of about 300 to about 1800 psig., a temperature of about 600°F. to about 850°F., a LHSV of about 1 to about 10 hr.$^{-1}$ and a hydrogen circulation rate of about 5000 SCFB to about 15,000 SCFB based on fresh charge stock, which catalyst is prepared by commingling said mordenite with an aluminum halide sol, gelling the resultant mixture, then calcining the gelled mixture, wherein said alumina carrier material contains about 20 to about 30 weight percent mordenite.

As hereinbefore set forth, the process of the present invention is particularly directed to the processing of hydrocarbons and mixtures of hydrocarbons boiling above 600°F. Since the production of LPG is to be maximized, suitable charge stocks will include heavy distillate hydrocarbons having an initial boiling point of about 600°F. to about 1000°F. and an end boiling point which may range from about 650°F. to about 1050°F. These charge stocks may be isolated by well-known processing techniques from tar sand, shale and coal. The effluent streams from cokers, thermal crackers, fluid catalytic crackers, crude units and visbreakers may also supply distillate hydrocarbons for these charge stocks.

Such charge stocks may be successfully processed even though quantities of sulfur are present. However, the hydrocarbon feed to be utilized in the second stage is preferably essentially free from sulfur and nitrogen.

As hereinabove described, the catalyst utilized in the first stage comprises a porous carrier material, a Group VI-B metal component and a Group VIII metal component. This catalyst may also contain a halogen component, preferably chlorine or fluorine and a sulfur component. This catalyst is commercially available and the prior art abounds with methods for its preparation.

As indicated above, the catalyst for the second stage comprises a Group VIII metal component combined with a support containing alumina and mordenite particles. Considering first the alumina, it is preferred that the alumina be a porous, adsorptive, high surface area material having a surface area of about 25 to about 500 or more square meters per gram. Suitable alumina materials are the crystalline aluminas known as gamma-, eta-, and theta-alumina with gamma-alumina giving best results.

It is an essential feature of the present invention that the alumina support contains finely divided mordenite particles. As is well known to those skilled in the art, mordenite is composed of a three-dimensional interconnecting network structure of silica and alumina tetrahedra. The tetrahedra are formed by four oxygen atoms surrounding a silicon or aluminum atom, and basic linkage between the tetrahedra are through the oxygen atoms. These tetrahedra are arranged in an ordered structure to form interconnecting cavities or channels of uniform size interconnected by uniform openings or pores. The ion-exchange property of mordenite follows from the trivalent nature of aluminum which causes the alumina tetrahedra to be negatively charged and allows the association of cations with them in order to maintain an electrical balance in the structure. The molecular sieve property of mordenite follows from the uniform size of the pores thereof which pores can be related to the size of molecules and used to remove a mixture of molecules, the molecules having a critical diameter less than or equal to the diameter of the pore mouths. For purposes of the present invention, it is preferred to use mordenite having pore mouths of about 5 Angstroms in cross-sectional diameter and more preferable about 5 to about 15 Angstrom units. Ordinarily, mordenite is synthetically prepared in the alkali metal form with one alkali metal cation associated with each aluminum centered tetrahedra. The alkali metal cation may be thereafter ion-exchanged with polyvalent cations such as calcium, magnesium, beryllium, rare earth cations, etc. Another treatment of alkali metal mordenite involves ion-exchange with ammonium ions followed by thermal treatment, preferably above 300°F. to convert to the hydrogen form. When the mordenite contains a high mole ratio of silica to alumina (for example, above 5) the material may be directly converted to an acid form in a suitable acid medium.

Although in some cases the polyvalent form of the mordenite may be used in the present invention, it is preferred to use the hydrogen form such as the alkali metal form, which is convertible to the hydrogen form during the course of the essential incorporation procedure discussed below.

The preferred mordenite for use in the present invention is the hydrogen and/or polyvalent forms of synthetically prepared mordenite. In fact, I have found best results with synthetic mordenite having an effective pore diameter of about 4 to about 7 Angstrom units and a mole ratio of silica to alumina of about 10 to about 25, preferably from about 11 to about 16. As is well known to those skilled in the art, mordenite differs from other known crystalline aluminosilicates in that its crystal structure is believed to be made up of chains of 5-member rings of tetrahedra which apparently are arranged to form a parallel system of channels having diameters of about 4 to 7 Angstroms interconnected by smaller channels having a diameter of about 2.8 Angstroms. Mordenite is characterized by the following formula:

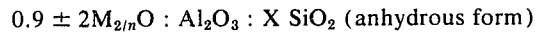

$$0.9 \pm 2M_{2/n}O : Al_2O_3 : X\ SiO_2 \text{ (anhydrous form)}$$

wherein M is a cation which balances the electrovalences of the tetrahedra, $n$ is the valence of M, and X is a constant generally ranging in value from 9 to 11 and usually about 10. The synthetic mordenite type zeolites are available from a number of sources, one being the Norton Company of Worcester, Mass.

Regarding the method of incorporating the mordenite particles into the alumina support, it is an essential feature of the present invention that the mordenite particles are added directly to an alumina hydroxyl halide sol prior to the sol being gelled. Although in some cases sol formed with fluorine, bromine, or iodine, may be satisfactory, I have found best results are obtained with an aluminum hydroxyl chloride sol formed by dissolving substantially pure aluminum metal in hydrochloric acid to result in a sol having a weight ratio of aluminum to chloride of about 1:1 to about 1.4:1. Additionally, it is preferred that the sol have a pH of about 2 to about 5. One advantage of this feature of the present invention is the relative ease with which the mordenite particles can be uniformly distributed in the resulting catalyst. However, the most important advantage is that the sol appears to react with the mordenite, causing some basic modification of its structure which enables the resulting support to have unusual ability to catalyze reactions which depend on carbonium ion intermediates such as hydrocracking to $C_3$ and $C_4$ fragments.

Accordingly, it is an essential feature of the present invention that the second stage catalyst is produced by the following steps: commingling finely divided mordenite particles with an aluminum hydroxyl halide sol to form a mixture thereof; gelling the resultant mixture to produce a hydrogel or particles of a hydrogel; then finishing the hydrogel into the catalyst by standard aging, washing, drying, and calcination treatments. For purposes of the present invention, the catalyst may be formed in any desired shape such as spheres, pellets, pills, cakes, extrudates, powders, granules, etc. However a particularly preferred form of the catalyst is the sphere; and spheres may be continuously manufactured by the well known oil drop method which comprises forming an alumina hydrosol, preferably by reacting aluminum metal with hydrochloric acid, combining the hydrosol with a suitable gelling agent such as hexamethylenetetramine to form a dropping solution, uniformly distributing finely divided mordenite particles throughout the dropping solution, and dropping the resultant mixture thereof and the gelling agent thereafter added to the mixture to form the dropping solution. In either case, the droplets of the mixture remain in the oil column until they set and form substantially spherical hydrogel particles. The spheres are then continuously subjected to specific aging treatments in oil and an ammoniacal solution to further improve their physical characteristics.

Alternatively, the hydrogel spheres may be pressure aged in the dropping oil or a similar oil which may make atmospheric aging in an ammoniacal solution unnecessary. Suitable conditions for pressure aging would include a temperature from about 20°C. to about 300°C. with a pressure sufficient to maintain the system in liquid phase. The resulting aged and gelled particles are then washed and dried at a relatively low temperature of about 300°F. to about 400°F. and subjected to a calcination procedure at a temperature of about 850°F. to about 1300°F. for a period of about 1 to about 20 hours. This treatment effects conversion of the alumina hydrogel to the corresponding crystalline gamma-alumina. See U.S. Pat. No. 2,620,314 for additional details regarding this oil drop method.

The amount of mordenite in the resulting alumina support is preferably about 20 to about 30 weight percent thereof. By the expression "finely divided" it is meant that the mordenite is used in a particle size having an average diameter of about 1 to about 100 microns, with best results obtained with particles of average diameter of less than 40 microns.

The catalyst for the second stage may contain a halogen component. Although the precise form of the chemistry of the association of the halogen component with the alumina support is not entirely known, it is customary in the art to refer to the halogen component as being combined with the alumina support, or with the other ingredients of the catalyst. This combined halogen may be either fluorine, chlorine, iodine, bromine, or mixtures thereof. Of these, fluorine, and particularly chlorine are preferred for the purposes of the present invention. As indicated above, a halogen component is inherently incorporated in the catalyst during preparation thereof. If desired, additional halogen may be added to the calcined catalyst as an aqueous solution of an acid such as hydrogen fluoride, hydrogen chloride, hydrogen bromide, etc. Moreover, an additional amount of the halogen component, may be composited with the catalyst during the impregnation of the latter with the Group VIII metal component. In any event, the halogen component may be combined with the support in amounts sufficient to result in a final catalyst which contains about 0.01 to about 1.5 weight percent and preferably about 0.1 to about 1.0 weight percent halogen calculated on an elemental basis.

An essential component of the second stage catalyst is the Group VIII metal component. The Group VIII metal may exist within the final catalytic composite as a compound such as an oxide, sulfide, halide, or in an elemental state. Generally the amount of the Group VIII metal component present in the final catalyst is small compared to the other components combined therewith. The Group VIII metal component generally comprises about 0.05 to about 1.5 weight percent of the final catalytic composite calculated on an elemental basis. Suitable Group VIII metals are platinum, iridium, osmium, palladium, rhodium, ruthenium, nickel, cobalt and iron. However, palladium and platinum are preferred.

The Group VIII metal component may be incorporated in the second stage catalytic composite in any suitable manner as ion-exchange and/or impregnation with a suitable solution of the metallic component. However, it is an essential feature of the present invention that the Group VIII metal component is combined with the catalyst base prepared by the method of the present invention after the calcination step described above. Accordingly, the preferred method of preparing a dual-function catalyst comprising a Group VIII metal component combined with the catalyst prepared by the method outlined above involves the utilization of water-soluble compounds of the Group VIII metal component to impregnate the calcined catalyst. For example, platinum metal may be added to the support by commingling the latter with an aqueous solution of chloroplatinic acid.

Regardless of the details of how the Group VIII metal component of the catalyst is combined with the catalyst, the resulting dual-function catalyst generally will be dried at a temperature of from about 200°F. to about 600°F. for a period of from about 2 to 24 hours or more and finally calcined at a temperature of about 700°F. to about 1100°F. for a period of about 0.5 to about 10 hours, and preferably 1 to about 5 hours.

It is preferred that the resultant calcined dual-function catalytic composite be subjected to reduction conditions prior to its use in the conversion of hydrocarbons. This step is designed to insure a uniform and finely divided dispersion of the Group VIII metal component throughout the carrier material. Preferably, substantially pure and dry hydrogen is used as the reducing agent in this step. The reducing agent is contacted with the calcined catalyst at a temperature of about 800°F. to about 1200°F. and a period of time of about 0.5 to 10 hours or more effective to substantially reduce the Group VIII metal component to its elemental state. This reduction treatment may be performed in situ as part of a start-up sequence if desired.

Although it is not essential, the resulting reduced dual-function catalyst is preferably subjected to a presulfiding operation designed to incorporate in the catalytic composite from about 0.05 to about 1.5 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50°F. to about 1100°F. or more.

Both reduction and presulfiding of the second stage catalyst may alternatively be performed simultaneously by contacting the calcined catalyst with a gas such as a mixture of hydrogen and hydrogen sulfide having about 10 moles of hydrogen per mole of hydrogen sulfide at conditions sufficient to effect the desired reduction and sulfiding, generally including a temperature ranging from about 50°F. to about 1100°F. or more.

According to the present invention, a hydrocarbon is contacted with the catalysts of the types described above in a first and second hydrocarbon conversion zone at hydrocarbon conversion conditions. This contacting may be accomplished by using the catalysts in a fixed bed system, a moving bed system, a fluidized bed system, or in a bath type operation; however, in view of the danger of attrition losses of the valuable catalysts and of well known operational advantages, it is preferred to use fixed bed systems. In these systems, the charge stock is preheated by any suitable heating means to the desired reaction temperature and then passed into a conversion zone containing a fixed bed of catalyst. It is, of course, understood that either the first or second conversion zone may be one or more separate reactors with suitable means therebetween to insure that the desired conversion temperature is maintained at the entrance to each reactor. It is also to be noted that the reactant may be contacted with the catalyst bed in either upward, downward, or radial flow fashion. In addition, it is to be noted that the reactants may be in the liquid phase, a mixed liquid-vapor phase, or a vapor phase when they contact the catalyst.

A heavy distillate hydrocarbon is charged to the first stage reaction zone which is maintained at hydrocracking conditions. An effluent stream containing hydrocarbons having a lower boiling range than the feedstock is withdrawn from the first stage conversion zone and which is stripped of hydrocarbon light ends comprising LPG and any other normally gaseous compounds, such as ammonia and hydrogen sulfide. At least a portion of the stripped product is introduced into the second stage conversion zone which is maintained at hydrocracking conditions. An effluent stream is withdrawn from the second stage conversion zone and passed through a condensing means to a separation zone, typically maintained at about 50°F. to about 125°F., wherein a hydrogen-rich gas is separated from a LPG rich liquid product. Preferably, at least a portion of this hydrogen-rich gas is withdrawn from the separating zone and is then recycled through suitable compressing means back to the second stage conversion zone. The liquid phase from the separation zone is then typically withdrawn and commonly treated in a fractionating system in order to recover LPG (i.e., liquefied petroleum gas) and other light ends.

The following example is given to further illustrate the process of the present invention and to indicate the benefits to be afforded through the utilization thereof. It is understood that the example is given for the sole purpose of illustrating a method for the practice of the present invention and that the example is not intended to limit the generally broad scope and spirit of the appended claims.

EXAMPLE

A diesel oil having a boiling range of 596°F. to 654°F. and a sulfur content of 1.0 weight percent was selected for maximum conversion to LPG. This diesel oil was processed in a hydrocracking reaction zone containing a catalyst comprising nickel and molybdenum supported on a silica-alumina carrier material, at a pressure of 1500 psig., a liquid hourly space velocity (LHSV) of 0.8 hr.$^{-1}$, and a hydrogen circulation rate of 12,000 standard cubic feet per barrel (SCFB) to yield a 550°F. end point kerosene containing only 3 ppm. sulfur. This kerosene was stripped to remove hydrocarbon light ends and hydrogen sulfide and then was processed in a second hydrocracking reaction zone containing a catalyst comprising platinum, alumina and mordenite and prepared as hereinabove described, at a pressure of 1000 psig., a liquid hourly space velocity of 3.0 hr.$^{-1}$ and a hydrogen circulation rate of 10,000 SCFB to yield 75 weight percent LPG and 25 weight percent pentanes.

The foregoing specification and example clearly illustrate the improvements encompassed by the present invention and the benefits to be afforded a process for the production of LPG from higher-boiling hydrocarbon charge stock.

I claim as my invention:

1. A process for the conversion of heavy distillate hydrocarbons boiling above about 600°F. to produce LPG, which process comprises the steps of:
   a. reacting said heavy distillate in a first reaction zone containing a catalytic composite comprising a porous carrier material, a Group VI-B metal component and a Group VIII metal component at hydrocracking conditions selected to convert the heavy distillate into lower boiling hydrocarbons;
   b. reacting at least a portion of said lower boiling hydrocarbons in a second reaction zone containing a catalytic composite comprising a Group VIII metal component combined with an alumina carrier material containing a uniform distribution of finely divided mordenite particles which catalytic composite is prepared by commingling said mordenite with an aluminum halide sol, gelling the resultant mixture then calcining the gelled mixture wherein said alumina carrier material contains from about 20 to about 30 weight percent mordenite, at hydrocracking conditions selected to produce LPG; and,
   c. recovering said LPG from the resulting first and second zone reaction zone effluents.

2. The process of claim 1 further characterized in that said heavy distillate is diesel oil or gas oil.

3. The process of claim 1 further charactereized in that said catalytic composite of said first reaction zone comprises an aluminosilicate carrier material, a nickel component and a molybdenum component.

4. The process of claim 1 further characterized in that said hydrocracking conditions include a pressure from about 300 to about 2000 psig., a temperature from about 600°F. to about 850°F., a LHSV of about 0.5 to about 10 hr.$^{-1}$ and a hydrogen circulation rate of about 5000 SCFB to about 15,000 SCFB.

5. The process of claim 1 further characterized in that said catalytic composite of said second reaction zone comprises platinum or a platinum compound.

6. The process of claim 1 further characterized in that said catalytic composite of said second reaction zone comprises palladium or a palladium compound.

7. The process of claim 1 further characterized in that said catalytic composite of said second reaction zone contains about 0.05 to about 1.5 weight percent halogen.

8. The process of claim 1 further characterized in that said catalytic composite of said second reaction zone contains about 0.1 to about 1.5 weight percent sulfur.

* * * * *